US008987952B2

(12) United States Patent
Dutau

(10) Patent No.: US 8,987,952 B2
(45) Date of Patent: Mar. 24, 2015

(54) ELECTRIC MACHINE INCLUDING A MULTI-CHANNEL FAN

(75) Inventor: Alexis Dutau, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 243 days.

(21) Appl. No.: 12/935,667

(22) PCT Filed: Feb. 16, 2009

(86) PCT No.: PCT/FR2009/050242
§ 371 (c)(1),
(2), (4) Date: Oct. 26, 2010

(87) PCT Pub. No.: WO2009/125096
PCT Pub. Date: Oct. 15, 2009

(65) Prior Publication Data
US 2011/0037330 A1    Feb. 17, 2011

(30) Foreign Application Priority Data

Apr. 8, 2008    (FR) ...................... 08 52347

(51) Int. Cl.
*H02K 9/22*    (2006.01)
*H02K 9/06*    (2006.01)

(52) U.S. Cl.
CPC ........................................ *H02K 9/06* (2013.01)
USPC .............................................. 310/62; 310/61

(58) Field of Classification Search
USPC .................... 310/60 A, 61–64, 52, 57–59
See application file for complete search history.

(56) References Cited

U.S. PATENT DOCUMENTS

| 1,896,749 | A | * | 2/1933 | Laffoon ........................ 415/188 |
| 1,996,460 | A | * | 4/1935 | Coates ............................ 310/62 |
| 2,604,501 | A | * | 7/1952 | Wightman ....................... 310/63 |
| 3,610,975 | A | * | 10/1971 | Onjanow ........................ 310/57 |
| 3,643,119 | A | * | 2/1972 | Lukens ........................ 310/60 R |
| 3,647,324 | A | * | 3/1972 | Rafferty et al. ............... 417/420 |
| 4,918,343 | A | * | 4/1990 | Heinrich et al. ............... 310/58 |
| 5,705,865 | A | * | 1/1998 | Ishida et al. ..................... 310/62 |
| 5,760,515 | A | * | 6/1998 | Burns .......................... 310/115 |
| 7,701,096 | B2 | * | 4/2010 | Noda et al. ....................... 310/57 |
| 2002/0117934 | A1 | * | 8/2002 | Kanazawa et al. ............ 310/263 |
| 2004/0150270 | A1 | * | 8/2004 | Nagayama et al. ............ 310/61 |
| 2006/0197403 | A1 | * | 9/2006 | Creviston et al. ............. 310/263 |
| 2006/0290214 | A1 | * | 12/2006 | Diestel-Feddersen et al. ........................... 310/68 D |

FOREIGN PATENT DOCUMENTS

| FR | 1 092 054 A | 4/1955 |
| FR | 1 319 228 A | 2/1963 |
| GB | 390291 A | 4/1933 |
| WO | WO 2008006934 A1 * | 1/2008 ............. F04D 25/08 |

OTHER PUBLICATIONS

International Search Report issued in Application No. PCT/FR2009/050242; Dated Aug. 10, 2009 (With Translation).
International Preliminary Report on Patentability issued in Application No. PCT/FR2008/050242; Dated Aug. 10, 2009.

* cited by examiner

*Primary Examiner* — Dang Le
*Assistant Examiner* — Naishadh Desai
(74) *Attorney, Agent, or Firm* — Oliff PLC

(57) ABSTRACT

The present invention relates to an open rotary electric machine having a rotor mounted to rotate relative to at least one stator and co-operating with the stator to define at least one airgap, the rotor being suitable for rotating at least one fan having at least two channels, said fan including a first channel generating a first cooling air stream passing through the stator, and a second channel generating a second cooling air stream passing through the rotor, the fan including a solid web separating the first and second air streams.

22 Claims, 11 Drawing Sheets

ELECTRIC MACHINE INCLUDING A MULTI-CHANNEL FAN

The present invention relates to rotary electric machines, and more particularly to the cooling of such machines.

It is known to drive a fan together with the rotor for the purpose of establishing a flow of a cooling fluid through the machine.

The invention seeks to further improve the cooling of so-called "open" electric machines in which air is taken from the surroundings of the machine and is then exhausted into the surroundings by the fan.

U.S. Pat. No. 1,896,749 describes a two-channel fan. The two air streams generated by that fan unite before passing through the machine.

U.S. patent application US 2004/0150270 A1 discloses two-channel fan machines in which the air streams flow in opposite directions through the rotor and the stator.

In one of its aspects, the invention provides an open rotary electric machine having a rotor mounted to rotate relative to at least one stator and co-operating with the stator to define at least one airgap, the rotor being suitable for rotating at least one multi-channel fan, said fan including a first channel generating a first cooling air stream passing through the stator, and a second channel generating a second cooling air stream passing through the rotor, the fan including a solid web separating the first and second air streams.

Advantageously, the first and second air streams are able to flow in separate manner through the machine, and in the same direction, e.g. from a common inlet towards the fan.

By separating the air streams, the invention makes it possible to some extent to increase the overall flow rate of air passing through the machine and thus to increase convective heat exchange, in particular with the rotor. The solid web in the fan serves to increase locally the coefficient of convective heat exchange with the rotor coils.

The solid web may be situated substantially in line with the surface of the stator that is adjacent to the airgap. The inside diameter of the solid web may correspond to the inside diameter of the stator.

The solid web may present a shape that is angularly continuous all the way to its free end. In a variant, the solid web may present at least one aperture. By way of example, the aperture may be defined by a notch extending from the end of the solid web that is adjacent to the airgap. The aperture preferably extends other than in line with an inter-pole channel of the rotor, thereby enabling the solid web to capture efficiency the air stream flowing in said inter-pole channel. The presence of apertures enables the head loss induced by the presence of said solid web to be limited.

The solid web may extend substantially as far as a stack of rotor laminations and/or it may overlie the coil overhangs of the stator axially in full or in part.

The solid web may present a shape that diverges on going away from its free end adjacent to the airgap. The web may have an inlet portion that is slightly conical with an angle at the apex lying in the range 0° to 45°, better in the range 0° to 20°.

Within the fan, the solid web may have a profile that is outwardly oriented, and it may terminate in a common terminal portion with an angle at the apex lying in the range 0° to 60°, better in the range 5° to 20°.

The fan may define air exhaust channels that are oriented obliquely to the axis of rotation of the machine.

When the head losses through the stator are lower than those through the rotor, the blades generating the first air stream may be shorter than the blades generating the second air stream.

The flow rate of the first air stream may for example lie in the range 0 to 20 cubic meters per second ($m^3/s$), and the flow rate of the second air stream may for example lie in the range 0 to 20 $m^3/s$.

The rotor may be a rotor having a coil.

The machine may constitute an alternator. Under such circumstances, the first and second air streams may penetrate into the machine via openings that are disposed around an exciter of the alternator. The alternator could also have an integrated exciter. The machine could also be a motor.

The electrical power of the machine may for example be greater than or equal to 1 kilovolt-amp (kVA).

The invention can be better understood on reading the following detailed description of a non-limiting embodiment thereof, and on examining the accompanying drawings, in which.

Figure 1:
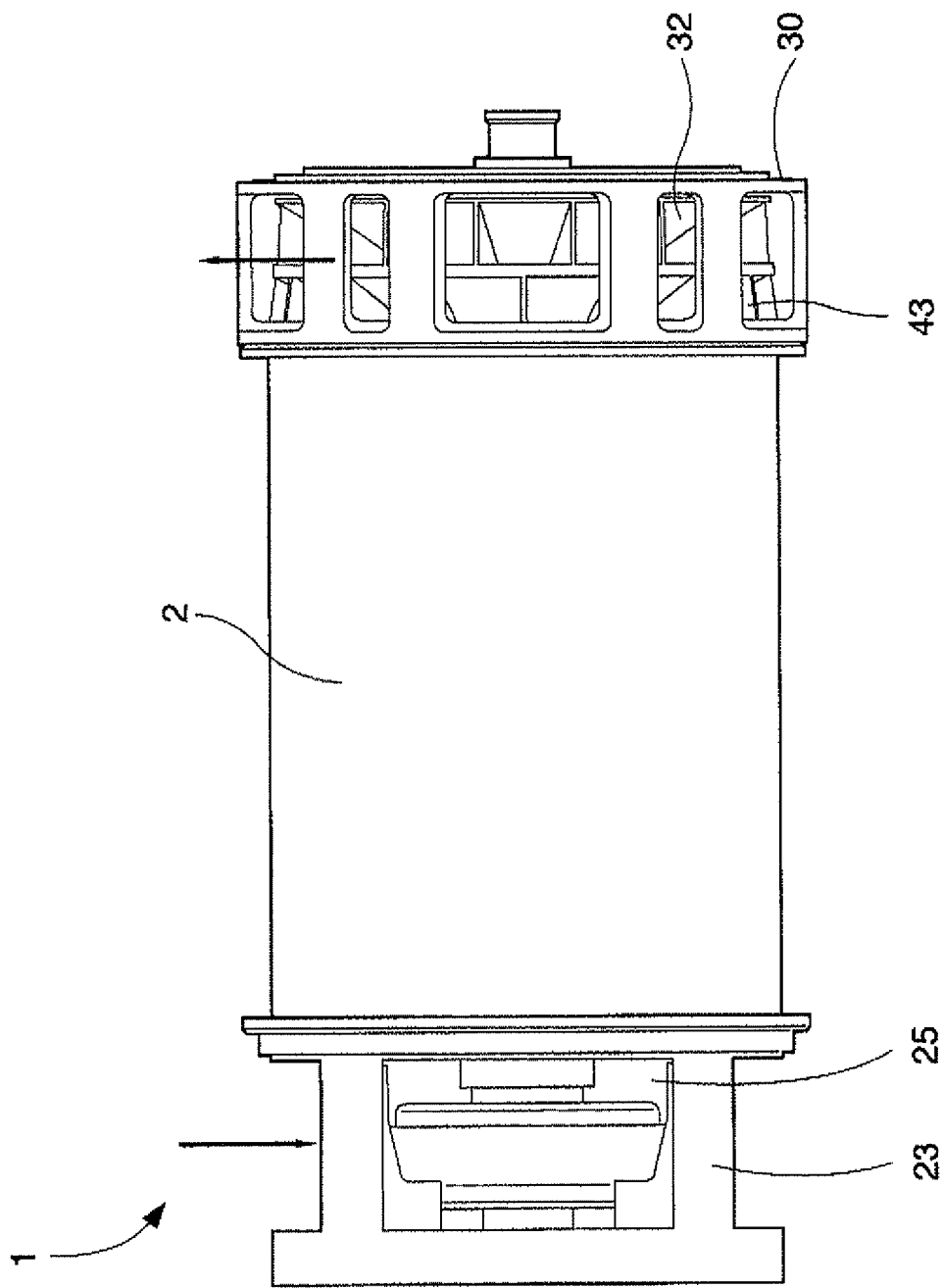
FIG. 1 is a side view of a machine made in accordance with the invention.
Figure 2:
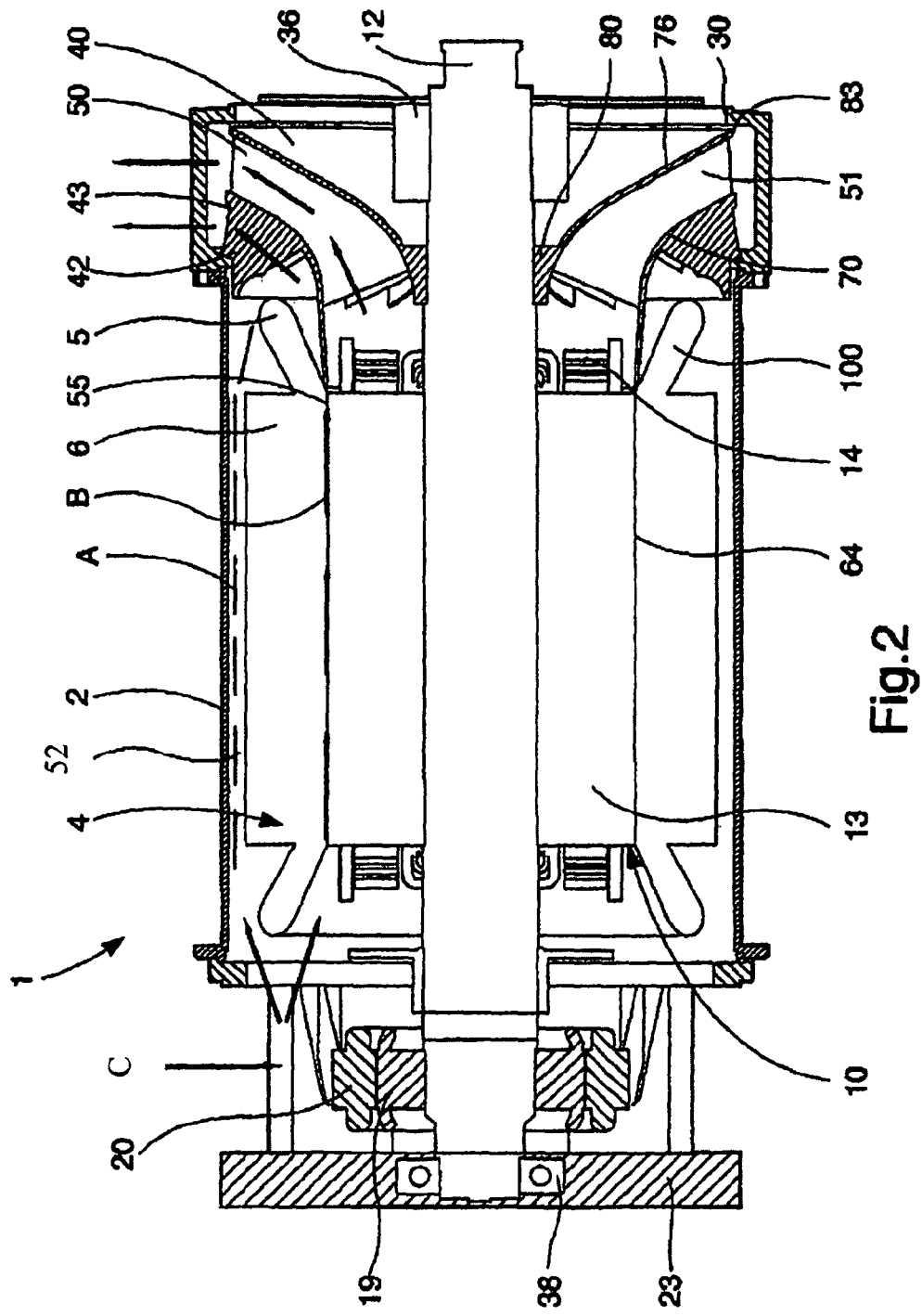
FIG. 2 is a diagrammatic and fragmentary longitudinal section view of the FIG. 1 machine.
Figure 3:
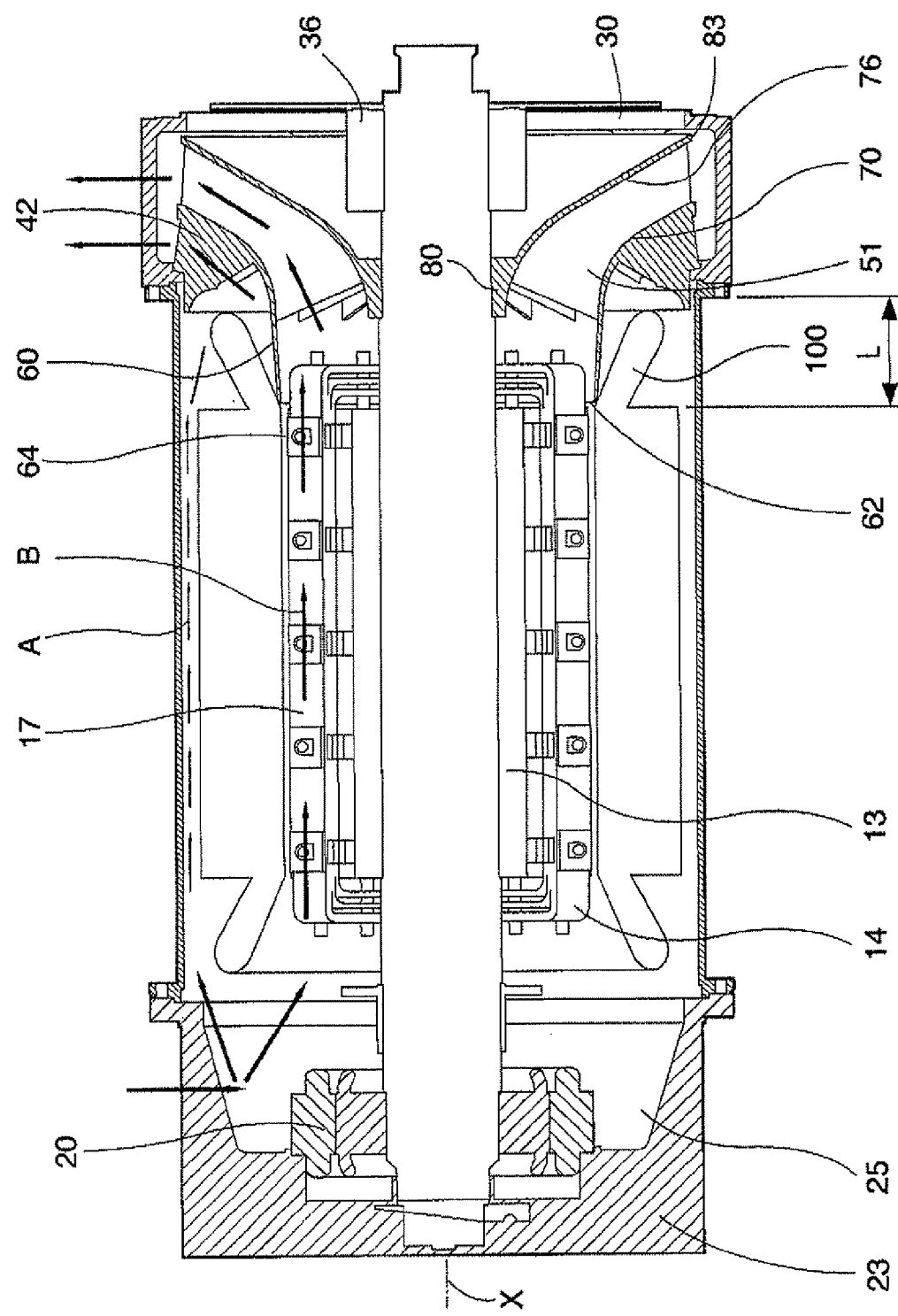
FIG. 3 is a view analogous to FIG. 2, on a different section plane.
Figure 4:
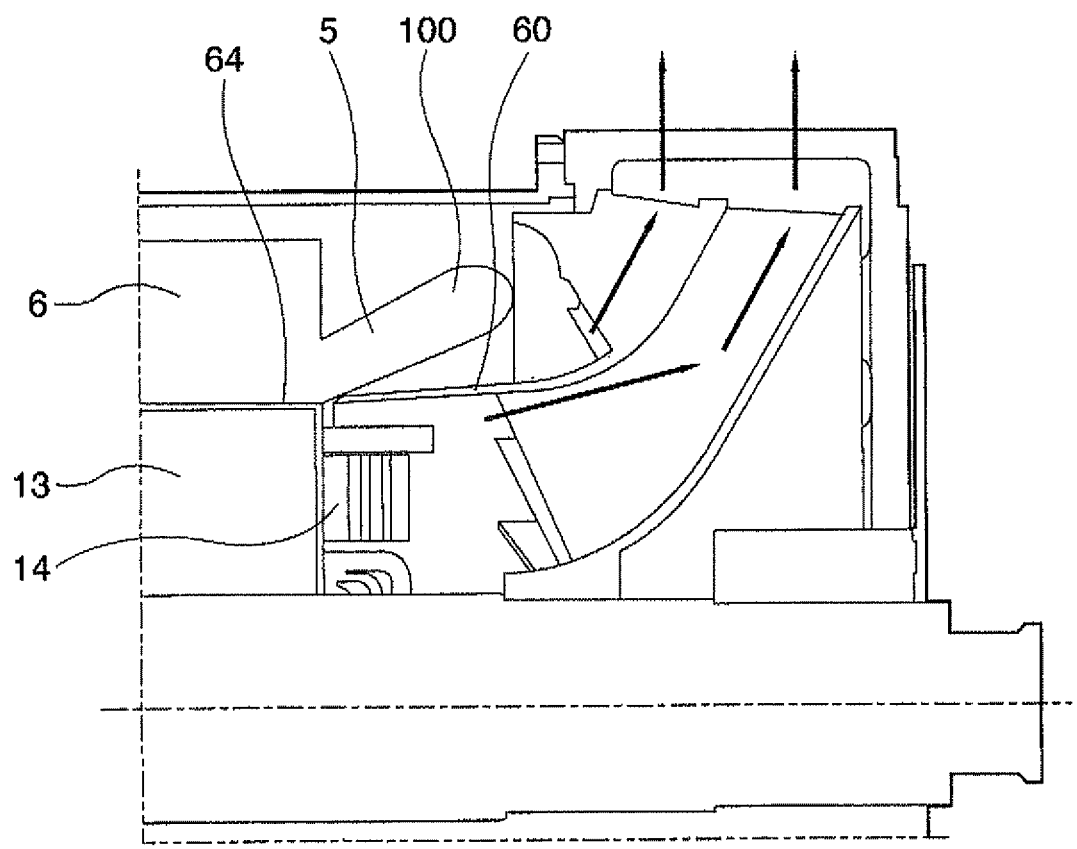
FIG. 4 shows a detail of FIG. 2.
Figure 5:
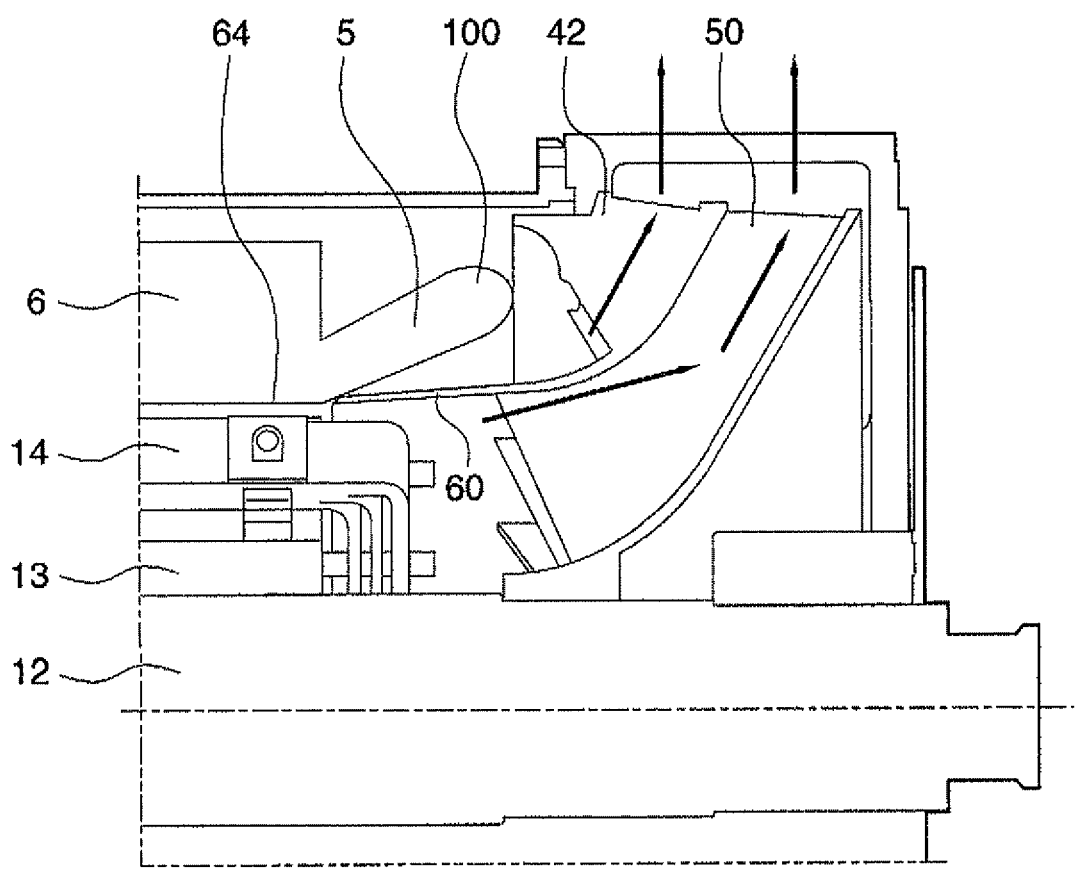
FIG. 5 shows a detail of FIG. 3.

The rotary electric machine 1 shown in FIGS. 1 to 3 comprises a casing 2 having a stator 4 secured thereto, the stator comprising a stack of stator magnetic laminations and windings 5.

Figure 6:
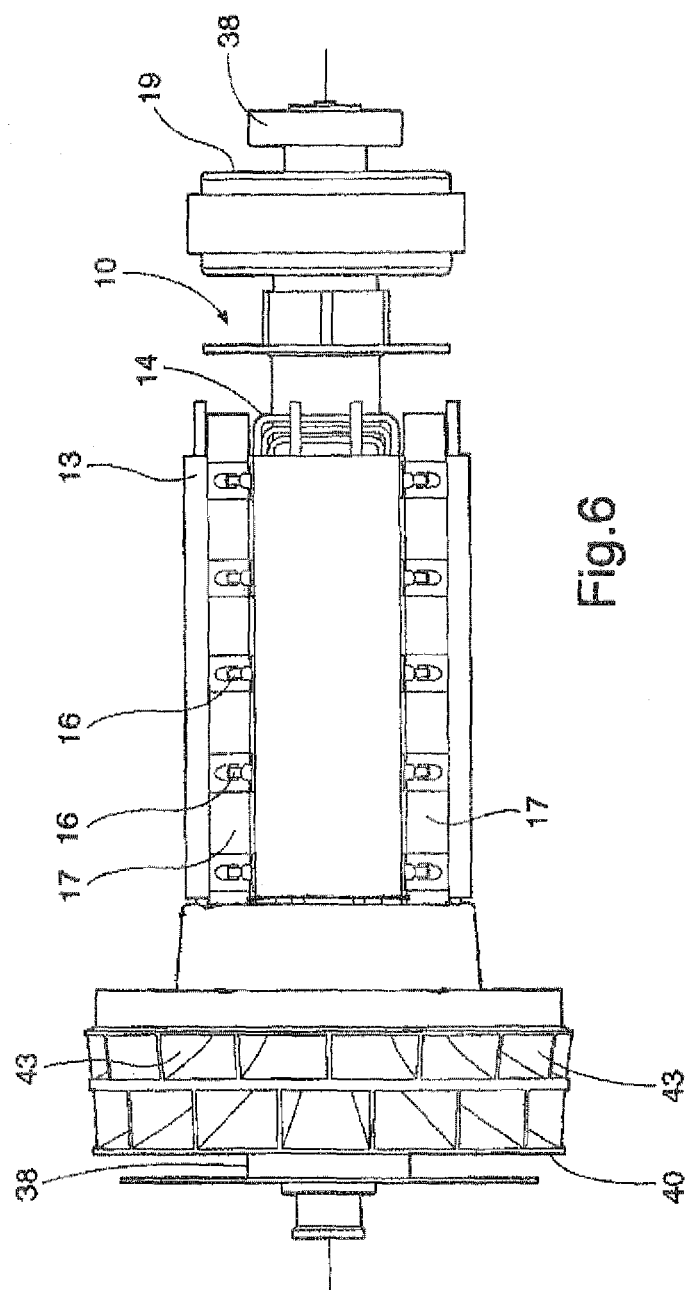
FIG. 6 shows the rotor in isolation.
Figure 7:
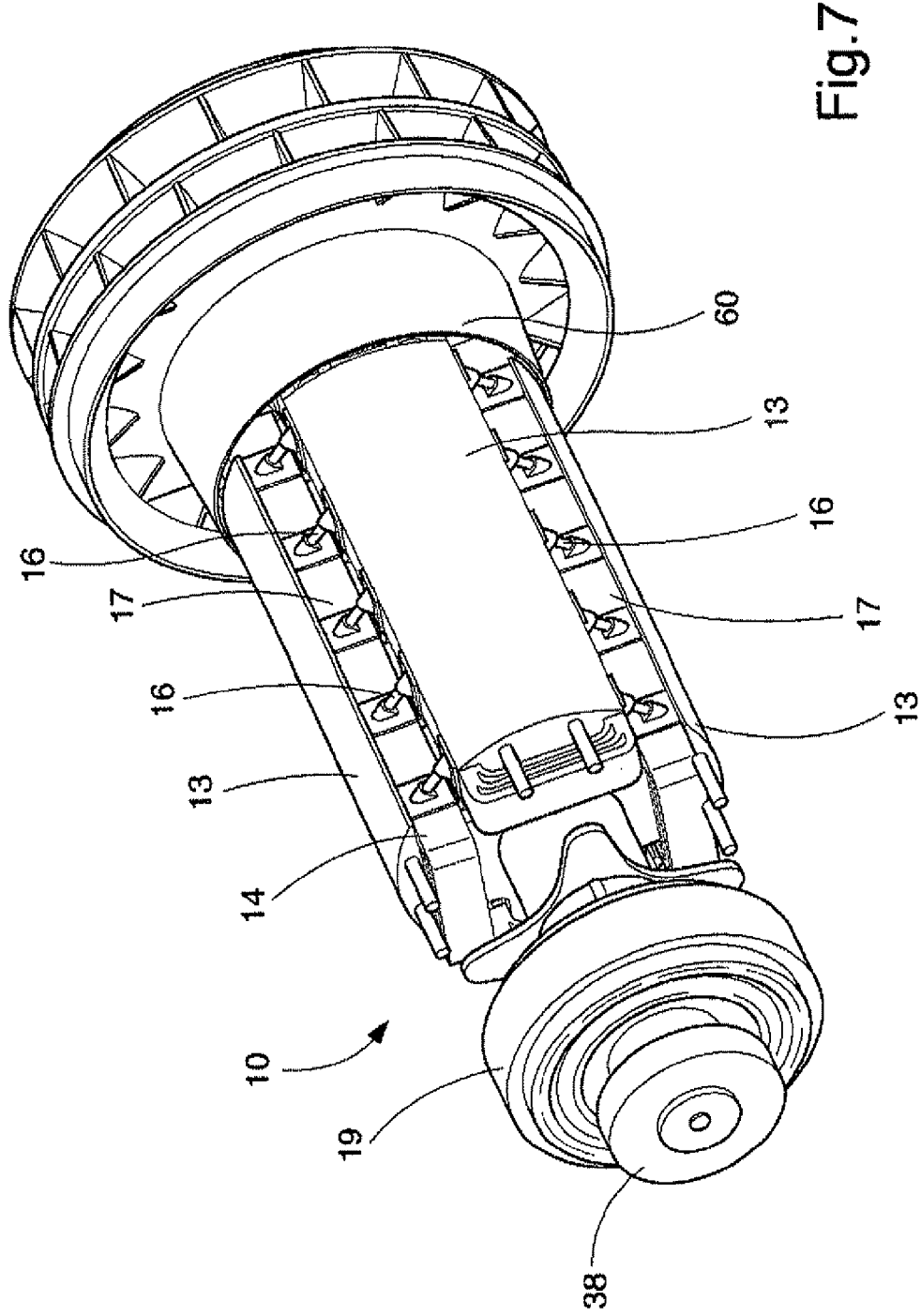
FIG. 7 is a diagrammatic perspective view of the rotor.
Figure 8:
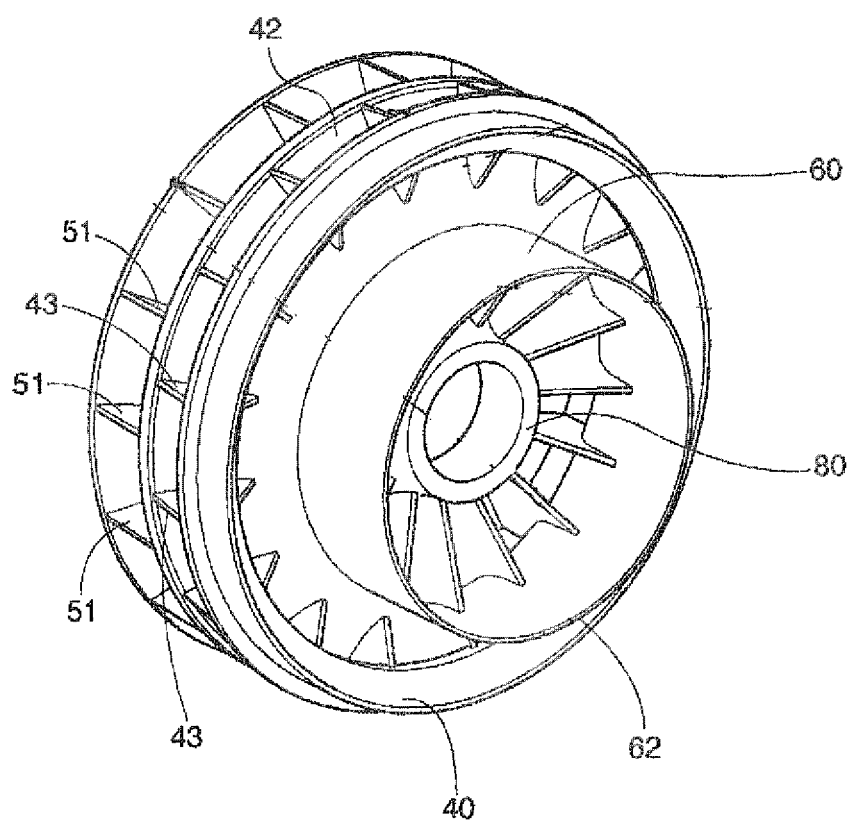
FIG. 8 is a perspective view showing the fan in isolation.

The machine 1 also has a rotor 10 that is shown in isolation in FIGS. 6 and 7, the rotor comprising a shaft 12 carrying a stack of rotor laminations 13 and windings 14.

In the example described, the machine 1 is a high power alternator and the rotor, also referred to as a rotary field, includes spacers 16 that hold the coils, as can be seen in FIG. 6.

Inter-pole channels 17 are formed between the poles of the rotor, as can be seen in particular in FIG. 7.

The rotor 10 may carry an exciter 19 that may interact with an exciter stator 20 within a first end plate 23, which in the example described is fitted to the casing 2 at the axial end thereof and supports bearings 38.

The end plate 23 includes apertures 25 defining cooling air inlets to the machine to allow entry of air.

The machine 1 also has a second end plate 30, at the opposite end from the first and including openings 32 for exhausting cooling air from the machine.

The second end plate 30 supports a set of ball bearings 36.

The rotor 10 drives a fan 40 in rotation, which fan is housed in part inside the second end plate 30.

The fan 40 has a first channel 42 having blades 43 located therein to create a first stream of cooling air A that flows from the air inlet 25 into at least one passage 52 situated between the casing 2 and the stack of stator laminations 6.

The fan 40 includes a second channel 50 provided with blades 51, which blades generate a second stream of cooling air B that flows both in the airgap 55 between the rotor and the stator as shown in FIG. 2, and also in the inter-pole channels 17.

The fan 40 includes a solid web 60 that separates the channels 42 and 50 and extends axially beyond the blades 51 towards the stator in the form of a cone of diameter that decreases a little in the air flow direction.

At its end, the web 60 presents an inside diameter that corresponds substantially to the diameter of the stator, such that the free edge 62 of the web 60 is situated substantially in line with the radially inside surface 64 of the stator.

The web 60 axially overlies the stator winding overhangs 100 over a distance L, as can be seen in FIG. 3.

Inside the fan 40, the web 60 forms the downstream web of the channel 42.

The fan 40 has a second web 76 that defines the channel 50, this web 76 extending from the hub 80 of the fan 40 to the end 83 thereof that is axially furthest from the stack of stator laminations.

At the outlet from the fan, the web 76 is directed substantially parallel to the web 60.

In the embodiment of FIGS. 1 to 8, the web 60 is angularly continuous.

Figure 9:
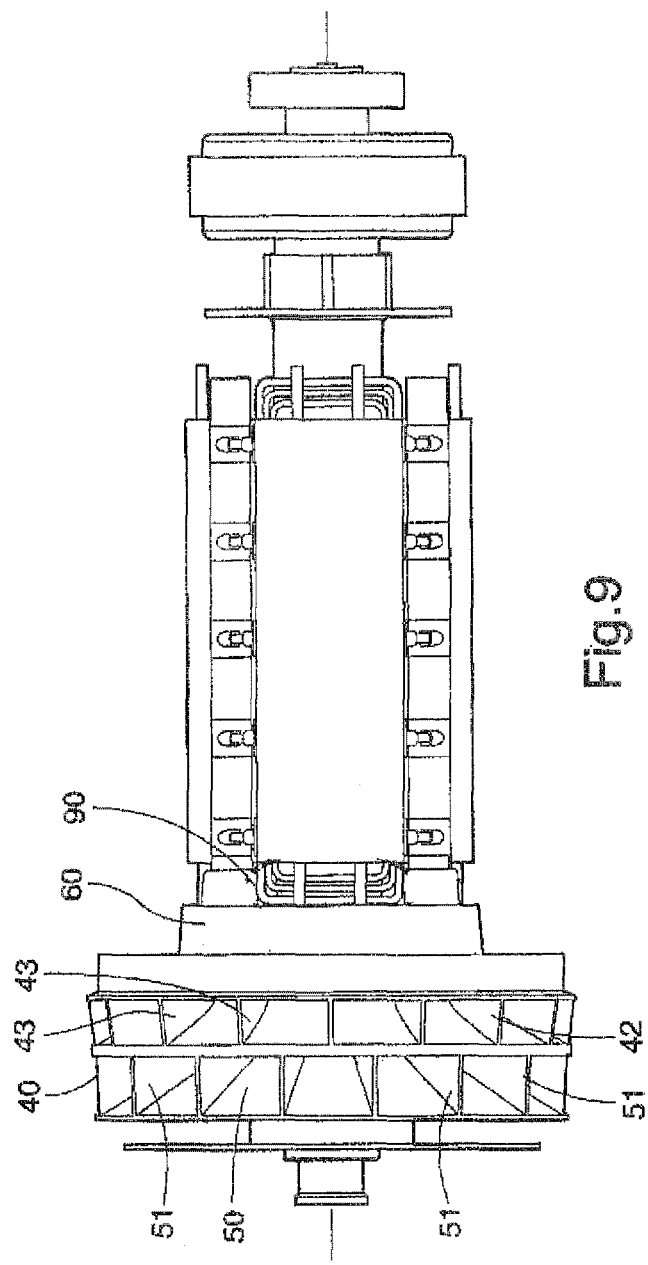
FIG. 9 is a view analogous to FIG. 6 showing a variant embodiment of the rotor.
Figure 10:
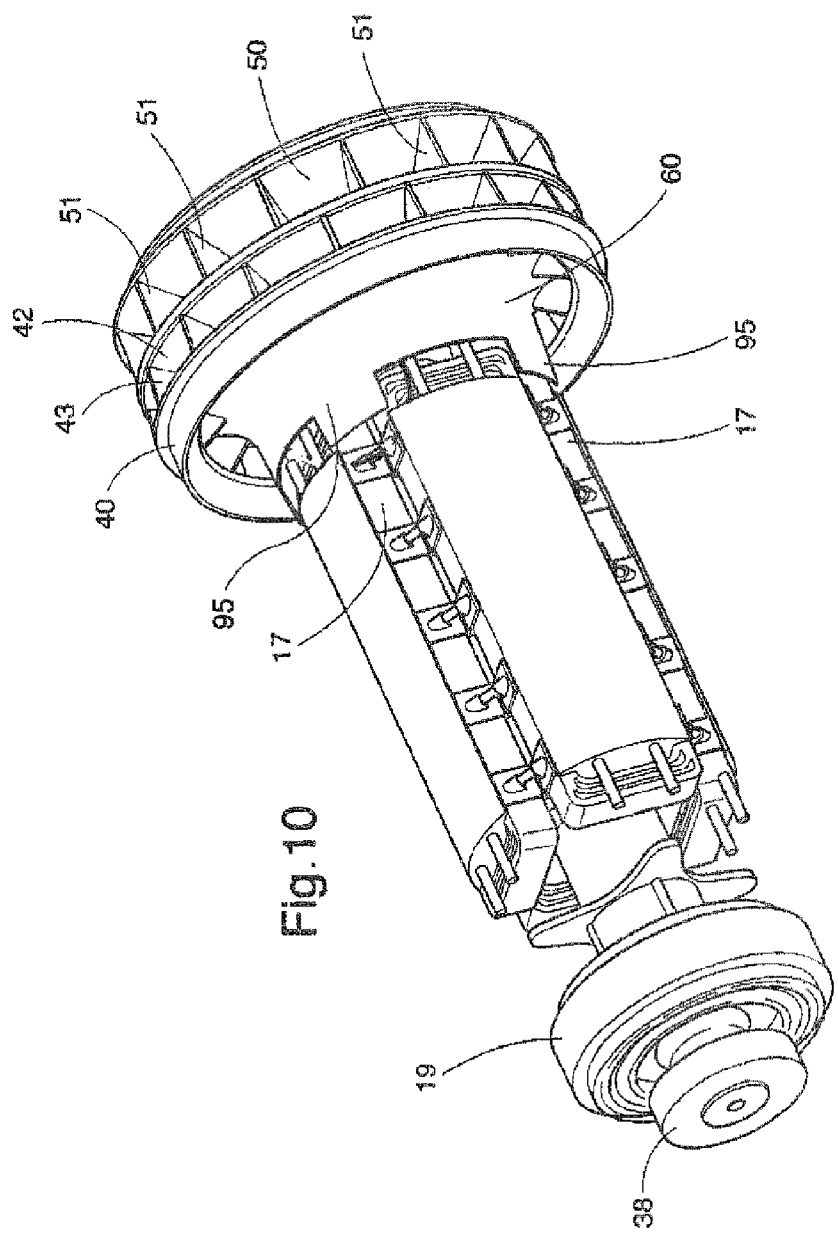
FIG. 10 is a diagrammatic perspective view of the FIG. 9 rotor.
Figure 11:
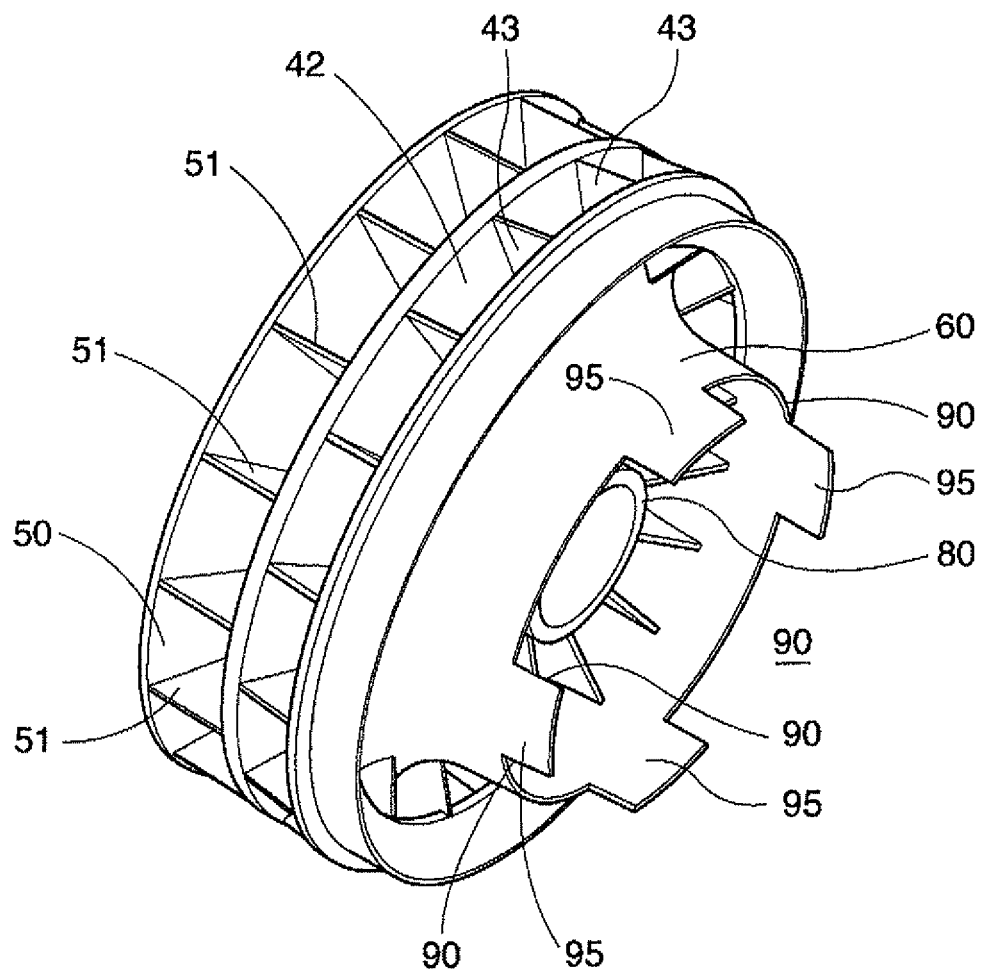
FIG. 11 shows the FIG. 9 fan in isolation.

In the variant embodiment of FIGS. 9 to 11, the web 60 includes apertures 90 in its portion that overlies the winding overhangs 100.

These apertures 90 are in the form of notches and they serve to reduce head losses.

The solid portions 95 extending between the apertures 90 are angularly positioned in line with the inter-pole channels 17, thereby enabling the suction created by the fan to be applied to the ends of the inter-pole channels 17, as can be seen in FIG. 10.

By flowing in the same direction and in separate manner through the machine, the streams A and B contribute to cooling it in effective manner.

Naturally, the invention is not limited to the embodiments described above.

The machine could be made in some other way, in particular concerning the shape of the fan, of the rotor(s), and/or of the stator(s). The machine need not have an exciter. The machine may be an internal rotor machine, as shown, or an external rotor machine.

The machine need not be an alternator; it could be a motor.

The fan may be made with channels and/or blades that are arranged differently.

The invention applies to any open machine that is cooled by a fluid that is set into motion by the action of at least one fan.

The term "comprising a" should be understood as being synonymous with "comprising at least one" unless specified to the contrary.

The invention claimed is:

1. An open rotary electric alternator having a rotor mounted to rotate relative to at least one stator and co-operating with the stator to define at least one airgap, the rotor rotating at least one fan having at least two channels, said fan including a first channel generating a first cooling air stream passing through the stator, and a second channel generating a second cooling air stream passing through the rotor in the same direction as the first air stream and in separate manner, the fan including a solid web separating the first and second air streams, wherein air containing the first and second air streams penetrates into the alternator via openings disposed around an exciter of the alternator,
the solid web presenting at least one aperture in its portion that overlies winding overhangs.

2. An alternator according to claim 1, the first and second air streams being generated from a common air inlet of the alternator.

3. An alternator according to claim 1, the solid web being situated substantially in line with the surface of the stator that is adjacent to the airgap.

4. An alternator according to claim 1, the solid web presenting a shape that is angularly continuous as far as its free end.

5. An alternator according to claim 1, the aperture being situated other than in line with an inter-pole channel of the rotor.

6. An alternator according to claim 1, the aperture being formed by a notch extending from the end of the solid web adjacent to the airgap.

7. An alternator according to claim 1, the solid web extending substantially as far as a stack of rotor laminations.

8. An alternator according to claim 1, the solid web extending axially so as to overlie the stator coil overhangs completely or in part.

9. An alternator according to claim 1, the solid web diverging away from its free end adjacent to the airgap.

10. An alternator according to claim 1, the solid web extending within the fan with a profile that is oriented radially outwards.

11. An alternator according to claim 1, the fan defining air ejection channels and walls of the air ejection channels adjacent to the outlet openings at air exiting ends of the air ejection channels being oriented obliquely relative to an axis of rotation of the alternator.

12. An alternator according to claim 1, the flow rate of the first air stream lying in the range 0 to 20 $m^3/s$.

13. An alternator according to claim 1, the flow rate of the second air stream lying in the range 0 to 20 $m^3/s$.

14. An alternator according to claim 1, the rotor having coils.

15. An alternator according to a claim 1, the electrical power of the alternator being greater than or equal to 1 kVA.

16. An alternator according to claim 1, the air containing the first and second air streams penetrating into the alternator perpendicularly to an axis of rotation.

17. An open rotary electric machine having a rotor mounted to rotate relative to at least one stator and co-operating with the stator to define at least one airgap, the rotor rotating at least one fan having at least two channels, said fan including a first channel generating a first cooling air stream passing through the stator, and a second channel generating a second cooling air stream passing through the rotor in the same direction as the first air stream and in separate manner, the fan including a solid web separating the first and second air streams, wherein the fan defines air ejection channels, and the solid web having walls contiguous to the air ejection channels adjacent to the outlet openings at air exiting ends of the air ejection channels, these walls being oriented obliquely relative to an axis of rotation of the machine.

18. An open rotary electric machine having a rotor having coils, and mounted to rotate relative to at least one stator and co-operating with the stator to define at least one airgap, the rotor rotating at least one fan having at least two channels, said fan including a first channel having first blades located therein to generate a first cooling air stream passing through the stator, and a second channel having second blades located therein to generate a second cooling air stream passing through the rotor in the same direction as the first air stream and in a separate manner, wherein the first and second blades are separated by a solid web, the rotor comprising interpole channels, the solid web including solid portions angularly positioned in line with the interpole channels and notches extending between the solid portions.

19. A machine according to claim 18, the coils comprising windings overhangs extending axially within the fan.

20. A machine according to claim 18, the fan comprising a hub in contact with a rotating shaft of the machine, the solid web including a conical portion having a diameter that increases with the flow direction, the conical portion extending axially at a distance from the hub.

21. A machine according to claim 18, comprising a casing with an inner diameter at a region extending around the rotor, and the fan comprising a portion around the solid web that faces radially a portion of the casing having said inner diameter.

22. An alternator according to claim 11, the air containing the first and second air streams penetrating into the alternator perpendicularly to the axis of rotation.

\* \* \* \* \*